(12) United States Patent
Perrey

(10) Patent No.: US 6,945,850 B2
(45) Date of Patent: Sep. 20, 2005

(54) SAW BLADE WITH ABRASIVE SURFACE

(76) Inventor: David A. Perrey, 2807 Brush Creek Ct., Jefferson City, MO (US) 65109-8832

( * ) Notice: Subject to any disclaimer, the term of this patent is extended or adjusted under 35 U.S.C. 154(b) by 181 days.

(21) Appl. No.: 09/777,383

(22) Filed: Feb. 6, 2001

(65) Prior Publication Data

US 2002/0106983 A1 Aug. 8, 2002

(51) Int. Cl.[7] .............................. B23F 21/03; B28D 1/02
(52) U.S. Cl. .................... 451/28; 125/13.01; 125/16.01; 125/21; 83/835; 451/540
(58) Field of Search .............................. 451/28, 56, 57, 451/63, 119, 158, 162, 164, 168, 177, 296, 540, 541, 548; 125/12, 13.01, 15, 16.01, 18, 21; 83/835

(56) References Cited

U.S. PATENT DOCUMENTS

| | | | | |
|---|---|---|---|---|
| 118,800 A | | 9/1871 | Green | |
| 1,139,817 A | * | 5/1915 | Smith | |
| 1,269,653 A | * | 6/1918 | Smith | |
| 2,524,323 A | | 10/1950 | Lloyd-Young | 51/195 |
| 3,615,309 A | * | 10/1971 | Dawson | 451/540 |
| 3,898,148 A | * | 8/1975 | Sam | 204/215 |
| 3,914,906 A | * | 10/1975 | Barnes | 30/514 |
| 4,369,685 A | * | 1/1983 | Trigg | 76/112 |
| 4,637,370 A | * | 1/1987 | Ishizuka | 125/15 |
| 4,675,975 A | | 6/1987 | Kucharczyk et al. | 29/566 |
| 5,018,276 A | * | 5/1991 | Asada | 30/347 |
| 5,115,796 A | | 5/1992 | Schweickhardt | 125/13.01 |
| 5,239,978 A | * | 8/1993 | Plangetis | 125/16.01 |
| 5,518,443 A | * | 5/1996 | Fisher | 125/15 |
| 5,529,528 A | | 6/1996 | Young et al. | 451/28 |
| 5,704,828 A | * | 1/1998 | Young et al. | 451/461 |
| 5,868,125 A | * | 2/1999 | Maoujoud | 125/15 |
| 6,039,641 A | * | 3/2000 | Sung | 125/22 |

FOREIGN PATENT DOCUMENTS

GB 2195099 A * 3/1988 .......... B24B/21/00

* cited by examiner

Primary Examiner—David B. Thomas
(74) Attorney, Agent, or Firm—Lathrop & Gage LC

(57) ABSTRACT

The present invention relates to a saw blade for cutting and finishing the surface of a work piece. The saw blade having a set of teeth disposed about the outer edge for making a cut in a work piece and an abrasive secured to the lateral surface of the saw blade. The abrasive extending laterally outwardly from the surface of the saw blade and providing a finishing effect on the work piece as the abrasive widens the cut beyond the cut of the saw blade teeth. A method for cutting and finishing a surface of a work piece utilizing a saw blade with an abrasive secured to a lateral surface of the blade and the abrasive extending beyond the cut of the saw blade teeth.

4 Claims, 3 Drawing Sheets

SAW BLADE WITH ABRASIVE SURFACE

FIELD OF THE INVENTION

The present invention relates to woodworking blades, and more particularly to saw blades incorporating an abrasive surface for simultaneously cutting and finishing the surface of a work piece. The present invention also relates to adaptations to saw blades that minimize the potential for the workpiece being kicked upwardly and rearwardly toward the operator abruptly with great force and speed, commonly referred to as "kickback."

DESCRIPTION OF THE PRIOR ART

The smoothness of a cut in the work piece is generally a function of the size of the teeth, the configuration of the teeth, and the number of the teeth per unit of circumference on circular saws and per unit of length on reciprocating saws and band saws. Generally, a fine-toothed saw blade will make a more finished cut than a coarse-toothed saw blade. The latter however, provides a more rapid cut, and is therefore preferable in many applications. Depending upon the workpiece, saw cuts made therein may have to be sanded smooth or finished by an abrasive tool, such as sander. This step adds to the cost of making the saw cut in terms of additional equipment being required, the costs attendant a workman sanding the cut and additional costs associated with completing the finished product. If it were possible to eliminate the extra step of sanding the cut surface in the work piece, significant savings could be realized. In some cases sanding of the cut surfaces after the cut is completed by attempting to remove the splintered wood from the edge of the surface will result in a rounding of the edge and a degradation of the aesthetic quality of the finished product and hence its value to the ultimate customer.

Highly skilled carpenters and cabinet makers make their living by creating joints in two or more pieces of wood appear seamless. The key to producing the seamless joint lies in the quality of the finish of the wood surface produced by the cutting tool. If the edges of the joint surface are torn and ripped by the cutting blade, the joint gap in the joined pieces of wood will appear large and unprofessionally done. Efforts to minimize torn and ripped edges of the work piece by improving the quality of the blade have included precision cutting of blade bodies from hardened steel and the utilization of laser technology to cut expansion slots. The expansion slots are considered to be one approach to eliminating blade distortion caused by centrifugal forces and thermal expansion stresses.

Another major concern with the current state of the art in cutting tools, particularly with saw blades is kickback. Anyone who has been involved with woodworking for any extended period of time has experienced saw blade kickbacks. Saw blade kickbacks can be very dangerous, and happen so quickly that it is impossible to react before injury occurs. On a table saw, the wood is thrown back violently. On a radial arm saw, the blade climbs quickly out of the cut. On a hand held circular saw, the saw is pushed back out of the cut. If the saw blade should bind in the kerf of a workpiece during a ripping or cross-cutting operation, the blade grabs the adjacent portion of the workpiece and tends to carry it along as it rotates. This rotational movement of the saw blade causes the workpiece to be kicked upwardly and rearwardly back toward the operator abruptly and with great force and speed. This occurrence may result from a number of conditions, such as the use of a dull saw blade or one with insufficient set, cutting a defective workpiece, or forcing the blade into the workpiece.

Efforts to reduce saw blade kickback include Teflon coating to reduce friction, heat, and resin build-up. Other measures include fitting table saws with splitters and with anti-kickback fingers. A splitter is a flat plate, preferably made of steel, which projects upwardly from the saw table and lies in a common plane with, and to the rear of, the saw blade. The splitter is positioned adjacent to the saw blade and the side of the splitter immediately adjacent to the saw blade has an arcuate contour which corresponds to the curve of the periphery of the saw blade, so that the splitter extends partially about the circumference of the saw blade.

A splitter is as thick as, or is slightly thinner than the saw blade so that it fits within the kerf made by a saw blade as a workpiece is fed past it. A splitter prevents the kerf from closing around the saw blade so that the body of the saw blade is prevented from binding against the sides of the cut workpiece. Kickback fingers typically consist of a pair of elongate pawls pivotally mounted at one end to the splitter and spring biased to extend downwardly and rearwardly toward the saw table. The pawls are attached to both sides of the splitter and include teeth formed in a lower edge. The teeth point rearwardly so that the pawls do not grip a workpiece as it is fed into the saw blade. In such a normal feed situation, the pawls pivot upwardly and ride over the upper surface of the workpiece. However, if kickback occurs, the sudden upward and reverse movement of the workpiece causes the teeth to dig into the upper surface of the workpiece and the pawls pivot forwardly to jam the workpiece against the table, thereby preventing its reverse movement from continuing.

A disadvantage with these anti-kickback systems is that, under certain circumstances, the teeth of the kickback pawls do not engage a workpiece in a kickback situation. This may occur when cutting plastics or wood laminates which have smooth, relatively hard upper surfaces which cannot be easily gripped by the teeth of the pawls. Another situation occurs when a relatively thick workpiece is used which causes the pawls to pivot upwardly sufficiently that the teeth are orientated at an angle which makes it difficult to engage the upper surface of the workpiece.

Accordingly, there is a need for an anti-kickback system which can accommodate work pieces made of plastic or wood and many other materials and can accommodate work pieces having varying thicknesses. Furthermore, there is a need for an anti-kickback system in which the workpiece is not damaged by teeth or other gripping means if a kickback situation occurs.

Various attempts have been made to incorporate an abrasive or a sanding element with saw blades and to a much lesser degree rotary bits.

U.S. Pat. No. 1,139,817 details a saw blade with an abrasive attached to both sides of the blade. This patent discloses a saw blade having teeth that are co-planar on each side with the outer surface of the abrasive material. The description further provides that if the set of the teeth is not sufficiently great, then the abrasive disks have to enter a cut in the wood or other material narrower than the interval between the outer surface of said disks, and consequently the saw is soon brought to rest. This invention specifically teaches away from the concept of the present invention wherein the abrasive media extends beyond the lateral periphery of the saw blade itself.

U.S. Pat. No. 1,269,653, by Smith details a cutting and abrasive implement with a pronounced annular shoulder on the cutting blade. The cutting blade must be specially manufactured with the annular recess thereby limiting its widespread utilization in what is currently a highly standardized industry consisting of circular saw blades, reciprocating saw blades, and band saw blades. In addition, the abrasive does not extend beyond the lateral periphery of the teeth.

U.S. Pat. No. 5,704,828, by Young, et. al., details a saw blade having a shallow cone shaped side and a planar obverse side. This system utilizes a complicated blade configuration as well as a cone shaped abrasive and requires that to maintain a finished sanded surface of the cut perpendicular to a specified axis of the workpiece, the axis of rotation of the saw blade is tilted to place a radial of the cone shaped abrasive surface orthogonal in three axis to the direction of the saw cut being made. The system has limited applicability as not all saws can be tilted as depicted by the system. In addition, the fall-off of the work piece is not reusable until required by passing it through the blade again in order to obtain a 90 degree surface. The abrasive in the system will come into contact with the work piece at a point dependent upon the lateral offset of the teeth because of the angular operation of the Young invention.

U.S. Pat. No. 5,115,796 by Schweichardt details a diamond abrasive saw blade for the dry sawing or cutting of concrete. The abrasive coating secured or bonded to the blade has a thickness less than or equal to the thickness of the diamond/matrix rim.

U.S. Pat. No. 2,524,323 by Lloyd-Young details the use of abrasive particles suitably attached to the sanding face of a disc for use in cutting and sanding devices. In Llyoyd-Young, the saw teeth overhang the abrasive disc and a complex detachable fastening means is utilized to join the sanding disc to the saw blade. Both the overhang and the complex nature of the detachable fastening mechanism are contrary to the proposed invention.

There has been a long standing need for saw blades that will simultaneously cut and finish the surface of a work piece and for saw blades that minimizes the potential for the workpiece being kicked upwardly and rearwardly toward the operator abruptly with great force and speed.

SUMMARY OF INVENTION

It is therefore the primary object of the present invention to provide a saw blade for cutting and sanding smooth a cut surface made in a work piece. Another object of the present invention is to provide a saw blade for cutting and finishing any angled cut surface made in a work piece. A still further object of the present invention is to provide a method for cutting and finishing a surface of a work piece with a saw blade. A still further object of the present invention is to provide a saw blade that will minimize the occurrence of saw blade kickback. A still further object of this invention is to provide simple use and easy control, easy labor and time saving interchangeability, more reliability, replacement, and disposability, with flexibility and rigidity. A still further object of this invention is to allow precise angle orientation of the abrading surface with the work object. A still further object of this invention is to allow ease of manufacture, and durable construction.

The method of the present invention of cutting and finishing a workpiece comprises selecting a circular saw, a reciprocating saw or a band saw blade and applying an abrasive coating to at least one side of the saw blade. The thickness of the abrasive coating extends beyond the lateral periphery of the cutting teeth of the saw blade. In addition, the abrasive coating extends from at least the base of the teeth of the saw blade to any point between the opposite edge of the saw blade. The saw blade is then attached to either a hand tool or a power tool. The tool and saw blade are then moved along a desired path in the workpiece, or with a stationary saw the workpiece is moved along a desired path. The saw blade teeth serve to cut the workpiece and the abrasive secured to the side of the saw blade provides further abrading action thereby expanding the kerf and simultaneously sanding the newly created surface on the workpiece.

The above and other objects, benefits and advantages of the present invention will become more apparent from the following descriptions when taken in conjunction with the accompanying drawings in which preferred embodiments of the present inventions are shown by way of illustrative example.

BRIEF DESCRIPTION OF THE INVENTION

DETAILED DESCRIPTION OF INVENTION

Figure 1:
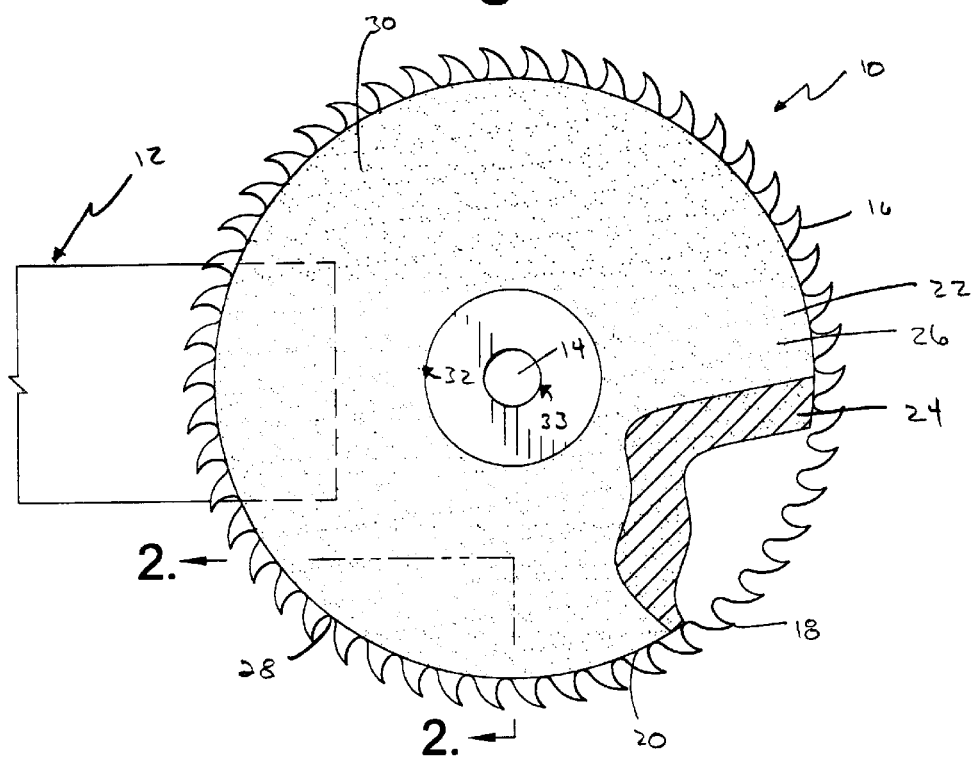
FIG. 1 is a side elevation view of a circular saw blade version of the invention embodying features for cutting and finishing a work piece.
Figure 2:
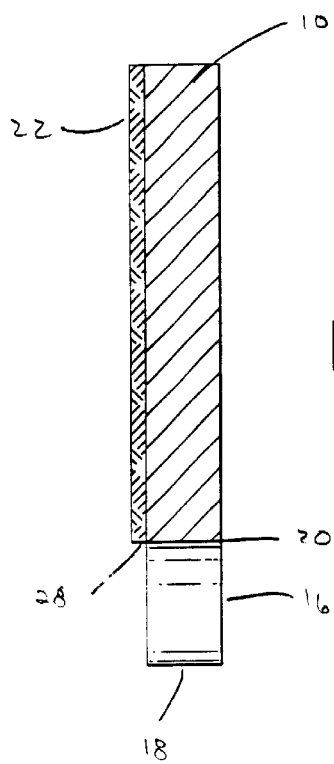
FIG. 2 is a cross sectional view on an enlarged scale taken along line 2—2 of FIG. 1 illustrating the abrasive coating applied to at least one side of the circular saw blade of a version of the invention.

Referring now to the FIGS. 1, and 2, a circular saw blade 10 for cutting and finishing the surface of a work piece 12 of the present invention is shown generally at 10. The circular saw blade 10 is generally comprised of a suitable high strength alloy or the like. The circular blade 10 has a central arbor hole 14 therein for mounting the saw blade on an arbor shaft of a saw. At the periphery of the blade are teeth 16 for cutting the work surface. The teeth have a tip 18 at the most extreme position and are joined to the saw blade at the base 20. The teeth 16 constitute the primary cutting mechanism for the saw blade 10.

Further as shown in FIGS. 1 and 2, the cutting and finishing saw blade 10 of the present invention includes an abrasive material 22 on both sides of the saw blade. However, it is to be understood that such an abrasive may be provided on just one side of the saw blade 10. The preferred embodiment would utilize abrasive material 22 on both sides of the saw blade 10 to maximize the cutting and sanding potential of the invention. The abrasive material 22 could comprise grit ranging in size from ten (10) to two hundred and twenty (220), for example. In addition, the abrasive material 22 could comprise a binder 24 having suitable abrasive particles 26 embedded therein and fixedly held in place by the binder 24. By way of illustration, binder 24 may be a suitable synthetic resin material and abrasive particles 26 may be suitable silicon carbide abrasive particles. However, it is to be understood that the abrasive coating may be comprised of a metallic binder with suitable abrasive particles embedded therein, a flame-sprayed-in place binder having abrasive having particles therein, or a coating of a suitable hardenable ceramic material having abrasive particles therein, or any other appropriate mechanism for fixedly securing an abrasive to the side of a circular saw blade.

As depicted in FIG. 1 the abrasive is applied, starting at the first boundary 28, and can cover any band 30 of the surface area of the circular saw blade side, up to the second boundary 32, which may coincide with the second edge 33 of the saw blade 10. The location of the second boundary 32 is based upon many factors including the economics associated with the application of the abrasive material 22 and the quality of the finish on the work piece that is desired, as more cutting surfaces will produce a smoother finish. The abrasive material 22 is uniformly distributed throughout the band 30. During the cutting operation, the saw blade teeth 16 initially impact the work piece 12, following the teeth, the abrasive material 22 on the side of the saw blade are exposed as they extend laterally beyond the range of the teeth 16. As the sharp cutting edges of the abrasive particles 26 engage the work piece they cut small, nearly microscopic, chips from the work piece. The large number of abrasive particles 26 on the side of the saw blade coupled with the rapid movement of the saw blade yield a work piece 12 that has been rapidly cut and which has a finished surface requiring no additional finish sanding.

Figure 3:
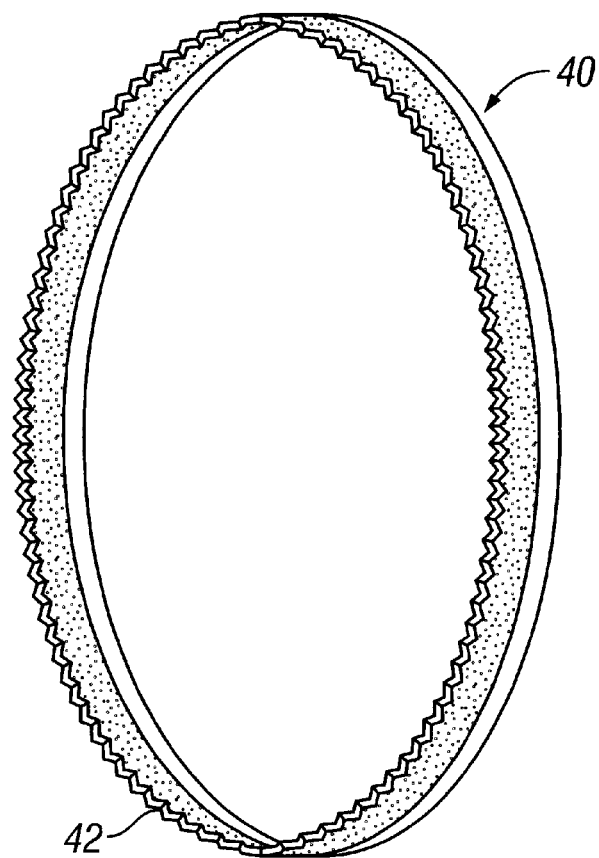
FIG. 3 is a perspective view of a band saw version of the invention embodying features for cutting and finishing a work piece.
Figure 4:
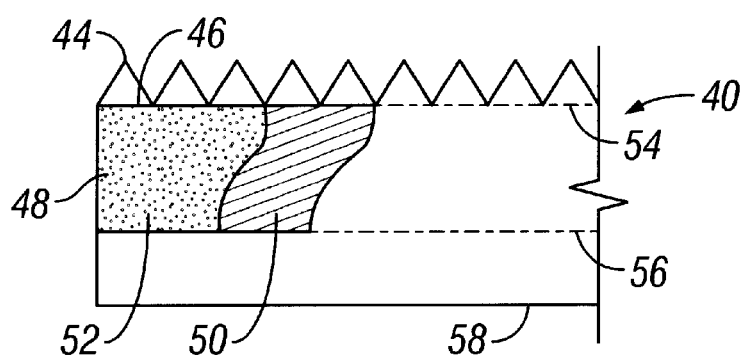
FIG. 4 is a elevation view of a band saw version of the invention embodying features for cutting and finishing a work piece.

FIGS. 3 and 4 depict a band saw blade 40. The band saw blade 40 utilizes teeth 42 to initially cut through the work piece (not depicted in FIGS. 3 and 4 ). The teeth 42 have a tip 44 and are joined to the band saw blade 40 at the base 46. Abrasive material 48 is either embedded into the band saw blade 40 or adheres to the band saw blade with the assistance of a binder 50. The abrasive material 48, as with the circular saw blade 10, is comprised of abrasive particles 52. The abrasive particles 52 extend from the first boundary 54 located adjacent the base 46 of the teeth 42 to the second boundary 56 proximate to the second edge 58.

Figure 5:
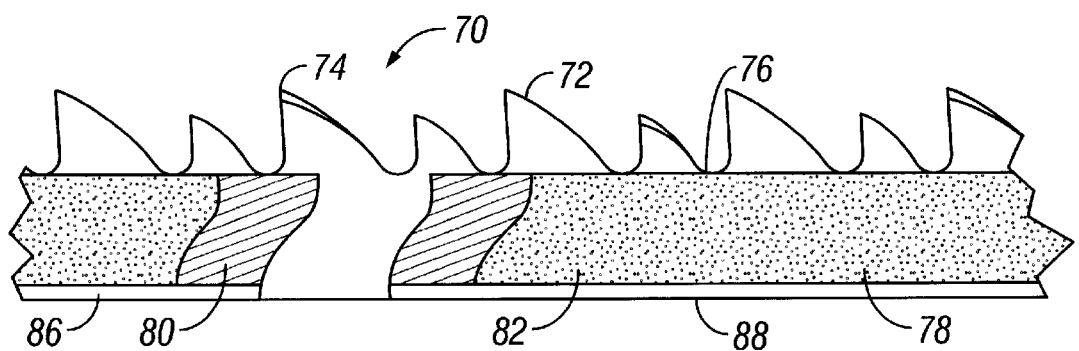
FIG. 5 is a side elevation view of a reciprocating saw version of the invention embodying features for cutting and finishing a work piece.
Figure 6:
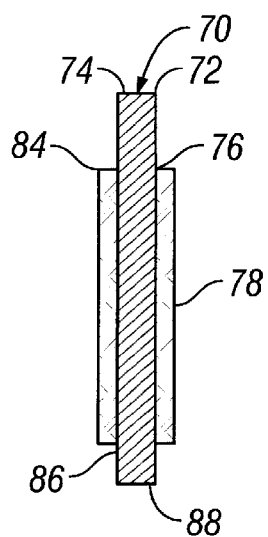
FIG. 6 is a front elevation view of a reciprocating saw version of the invention embodying features for cutting and finishing a work piece.

FIGS. 5 and 6 depict a reciprocating saw blade 70 such as from a jig saw or a hack saw. The reciprocating saw blade 70 utilizes teeth 72 to initially cut through the work piece (not depicted in FIGS. 5 and 6 ). The teeth 72 have a tip 74 and are joined to the reciprocating saw blade 70 at the base 76. Abrasive material 78 is either embedded into the reciprocating saw blade 70 or adheres to the reciprocating saw blade with the assistance of a binder 80. The abrasive material 78, as with the circular saw blade 10, is comprised of abrasive particles 82. The abrasive particles 82 extend from the first boundary 84 located adjacent the base 76 of the teeth 72 to the second boundary 86 proximate to the second edge 88.

While the principles of the invention have now been made clear in an illustrative embodiment, it will be immediately obvious to those skilled in the art many modifications of structure, arrangement, proportions, elements, materials and components used in the practice of the invention which is particularly adapted for specific environments and operating requirements without departing from those principles.

What is claimed is:

1. An apparatus for cutting and finishing the surface of a work piece and minimizing kickback, the apparatus comprising:
   (a) a saw blade comprising two sides and teeth disposed along a first edge for producing a cut in a work piece and for finishing a surface on the work piece, the teeth having a tip at the outermost edge of the saw blade and a base disposed opposite the tip, the saw blade having a second edge disposed opposite the first edge;
   (b) abrasive material embedded in both sides of the saw blade, the abrasive material disposed between a first boundary and a second boundary the first boundary disposed adjacent the base of the teeth, the second boundary disposed adjacent the second edge, the abrasive material extending laterally from both sides of the blade beyond the teeth;
   (c) abrasive material disposed between the first and second boundary extending laterally from the first side beyond the teeth thereby creating a cut in the work piece wider than the teeth and preventing binding of the saw blade as the blade progresses through the work piece; and
   (d) the saw blade comprising a blade selected from the group consisting of a circular saw, a reciprocating saw and a band saw.

2. A method for cutting and finishing a surface of a work piece in a single pass with a saw blade, said method comprising the steps of:
   (a) selecting a saw blade with a first side and a second side and teeth for cutting the work piece, each tooth comprising a tip at the first edge of the saw blade and a tooth base disposed opposite the tip, the saw blade further comprising a second edge, the second edge disposed opposite the first edge;
   (b) applying an abrasive material to both sides of the saw blade, the abrasive material having a first boundary and a second boundary, the first boundary disposed adjacent the base of the teeth, the second boundary disposed proximate the second edge, the abrasive material disposed between the first and second boundary extending laterally beyond the furthest extreme of the saw blade teeth;
   (c) wherein the step of applying the abrasive material to the saw blade is by a process selected from the group consisting of adhering the abrasive material and embedding the abrasive material in the saw blade;
   (d) passing the saw blade through the work piece to thereby simultaneously cut and finish the work piece surface; and
   (e) forming a cut in the work piece wider than the teeth of the saw blade to prevent saw blade kickback.

3. The method as set forth in claim 2 wherein the step of selecting a saw blade comprises selecting a blade from the group consisting of a circular saw blade, a reciprocating saw blade and a band saw blade.

4. An apparatus for cutting and finishing the surface of a work piece, said apparatus comprising:
   a saw blade with a first and second side and teeth for cutting the work piece, the teeth having a tip at the outermost edge of the saw blade and a base disposed opposite the tip, the saw blade having a first edge and a second edge, the base forming the first edge and the second edge disposed opposite the first edge;
   an abrasive material embedded in at least the first side of the saw blade, the abrasive material extending laterally beyond the teeth between a first boundary and a second boundary, the first boundary coincident with the first edge, the second boundary proximate the second edge; and
   means for securing the abrasive material by either embedding or bonding the abrasive material between the first boundary and the secondary boundary.

* * * * *